United States Patent [19]

Christenson et al.

[11] Patent Number: 4,560,717

[45] Date of Patent: Dec. 24, 1985

[54] CATIONIC ELECTRODEPOSITABLE COMPOSITIONS CONTAINING FORMALDEHYDE SCAVENGER

[75] Inventors: Roger M. Christenson, Gibsonia; Joseph T. Valko, Pittsburgh; Joseph E. Plasynski, Arnold; Roger L. Scriven, Gibsonia, all of Pa.

[73] Assignee: PPG Industries, Inc., Pittsburgh, Pa.

[21] Appl. No.: 627,587

[22] Filed: Jul. 3, 1984

[51] Int. Cl.[4] ............................................. C08K 5/21
[52] U.S. Cl. .................................... 523/456; 523/415; 523/416; 524/210; 524/211; 524/510; 524/512
[58] Field of Search ............... 524/901, 210, 211, 510, 524/512; 523/415, 416, 456

[56] References Cited

U.S. PATENT DOCUMENTS

| | | | |
|---|---|---|---|
| 3,663,389 | 5/1972 | Koral et al. | 204/181 |
| 3,937,679 | 2/1976 | Bosso et al. | 260/29.3 |
| 3,963,663 | 6/1976 | Sekmakas | 524/901 |
| 4,028,367 | 6/1977 | Higginbottom | 524/841 |
| 4,397,756 | 8/1983 | Lehmann | 524/21 |
| 4,454,277 | 6/1984 | Heger | 524/211 |
| 4,473,678 | 9/1984 | Fink | 524/211 |

FOREIGN PATENT DOCUMENTS

| | | |
|---|---|---|
| 43036-B | 6/1983 | European Pat. Off. . |
| 3147007 | 10/1983 | Fed. Rep. of Germany . |
| J83056387-B | 2/1976 | Japan . |
| 8105529 | 4/1983 | Sweden . |

Primary Examiner—C. Warren Ivy
Attorney, Agent, or Firm—William J. Uhl

[57] ABSTRACT

Formaldehyde-containing cationic electrodepositable compositions to which are added a formaldehyde scavenger are disclosed. Also disclosed are the use of these compositions in a method of cationic electrodeposition. Free formaldehyde in cationic compositions can lower the pH of the compositions making them more corrosive to the metal parts such as ferrous metal tanks and attending piping and pumps in contact with such compositions. The presence of the formaldehyde scavenger in such compositions stabilizes the pH.

14 Claims, No Drawings

CATIONIC ELECTRODEPOSITABLE COMPOSITIONS CONTAINING FORMALDEHYDE SCAVENGER

BACKGROUND OF THE INVENTION

1. Field of the Invention

The present invention relates to improved cationic compositions and to the use of these compositions in cationic electrodeposition. More particularly, the present invention relates to cationic compositions containing a material which contains free formaldehyde and/or is capable of generating free formaldehyde.

2. Brief Summary of the Prior Art

Cationic compositions for use in electrodeposition are well known in the prior art. Such compositions are used extensively in the automobile industry for applying primer coats to automobile and truck bodies. Typical of the prior art describing such compositions and their use in electrodeposition is U.S. Pat. Nos. 3,799,854; 3,947,338; 3,947,339 and 3,984,299.

Cationic electrodepositable compositions containing a material prepared from formaldehyde and containing methylol or substituted methylol groups such as aminoplast resins and phenoplast resins are also well known in the art. Such materials can be used for curing or they can be present in the compositions as an additive for the purpose of plasticizing, improving adhesion or imparting other desirable effects to the coating. Prior art which describes the use of such materials in cationic electrodepositable compositions are U.S. Pat. Nos. 3,663,389 and 3,937,679.

Surprisingly, it has been found that cationic compositions, particularly those containing primary and/or secondary amino groups in combination with materials prepared from formaldehyde-reactive material and containing methylol or substituted methylol groups such as aminoplasts, often exhibit a lowering of the pH with time. The lowering of pH has been found to be due to the presence of free formaldehyde in the composition. Although formaldehyde is not itself acidic, it may be converted to formic acid by any of several mechanisms such as oxidation or disproportionation. Also, the formation of aminals from the reaction of formaldehyde with primary or secondary amines can result in a lowered pH. This makes the compositions more corrosive with the ferrous metal parts such as the electrodeposition tanks and attending piping and pumps in contact with such compositions. The formaldehyde can be present with the aminoplast but even with low free formaldehyde-containing materials, can be generated by hydrolysis of aminoplast. It has been found that lowering of the pH can be abated and the pH stabilized by adding to the cationic compositions a formaldehyde scavenger.

SUMMARY OF THE INVENTION

In accordance with the present invention, an improved aqueous cationic electrodepositable composition which contains free formaldehyde and/or is capable of generating free formaldehyde which lowers the pH of the cationic composition is disclosed. The improvement of the invention comprises including in such compositions a formaldehyde scavenger in an amount sufficient to stabilize the pH of the composition.

The invention also provides for a method of cationic electrodeposition using the improved cationic compositions. The electrodeposition process can be conducted in a continuous manner with the formaldehyde scavenger being added to the electrodeposition bath to maintain its concentration within the desired range.

DETAILED DESCRIPTION

The cationic composition of the present invention comprises a film-forming resin which contains a positively charged resin. Examples such film-forming resins include amine salt group-containing resins such as the acid-solubilized reaction products of polyepoxides and primary or secondary amines such as those described in U.S. Pat. Nos. 3,663,389; 3,984,299; 3,947,338 and 3,947,339. Usually, these amine salt group-containing resins are used in combination with a blocked isocyanate curing agent. The isocyanate can be fully blocked as described in the aforementioned U.S. Pat. No. 3,984,299 or the isocyanate can be partially blocked and reacted with the resin backbone such as described in U.S. Pat. No. 3,947,338. Also, one-component compositions as described in U.S. Pat. No. 4,134,866 and DE-OS 2,707,405 can be used as the film-forming resin. Besides the epoxy-amine reaction products, film-forming resins can also be selected from cationic acrylic resins such as those described in U.S. Pat. Nos. 3,455,806 and 3,928,157.

Besides amine salt group-containing resins, quaternary ammonium salt group-containing resins can also be employed. Examples of these resins are those which are formed from reacting an organic polyepoxide with a tertiary amine salt. Such resins are described in U.S Pat. Nos. 3,962,165; 3,975,346 and 4,001,101. Examples of other cationic resins are ternary sulfonium salt group-containing resins and quaternary phosphonium salt group-containing resins such as those described in U.S. Pat. Nos. 3,793,278 and 3,984,922, respectively. Also, film-forming resins which cure via transesterification such as described in European Application No. 12463 can be used. Further, cationic compositions prepared from Mannich bases such as described in U.S. Pat. No. 4,134,932 can also be used.

The resins to which the present invention is particularly effective are those positively charged resins which contain primary and/or secondary amine groups. Such resins are described in U.S. Pat. Nos. 3,663,389; 3,947,339 and 4,116,900. In U.S. 3,947,339, a polyketimine derivative of a polyamine such as diethylenetriamine or triethylene-tetraamine is reacted with a polyepoxide. When the reaction product is neutralized with acid and dispersed in water, free primary amine groups are generated. Also, equivalent products are formed when polyepoxide is reacted with excess polyamines such as diethylenetriamine and triethylene-tetraamine and the excess polyamine vacuum stripped from the reaction mixture. Such products are described in U.S. Pat. Nos. 3,663,389 and 4,116,900.

Besides the film-forming resin, the compositions of the present invention may also contain a material which contains free formaldehyde and/or is capable of generating free formaldehyde. Such materials can be prepared from a formaldehyde-reactive material and formaldehyde and contain methylol or substituted methylol groups. The free formaldehyde has been found to lower the pH of the cationic compositions. Examples of such materials are aminoplast, phenoplast and materials derived from N-methylol(meth)acrylamide and lower alkylated derivatives thereof. Such materials may contain free formaldehyde and/or are capable of generating free formaldehyde under aqueous conditions, particularly dilute aqueous acidic conditions such as is encountered in a cationic electrodeposition bath.

Examples of aminoplast resins are the reaction products of ureas including substituted ureas, and triazines such asmelamine, benzoguanamine and acetoguanamine with formaldehyde which may optionally be etherified with an alcohol. Essentially completely etherified products are preferred from a stability standpoint. Specific examples of aminoplast plast resins are the reaction product of urea, ethylene urea, thiourea, melamine, benzoguanamine, acetoguanamine and glycouril with formaldehyde. The aminoplast resins can be used in the methylol form but preferably are utilized at least in part in the ether form where the etherifying agent is a monohydric alcohol containing from about 1 to 6 carbon atoms. Examples of suitable alcohols are methanol and butanol. Aminoplast resins and their method of preparation are described in detail in "Encyclopedia of Polymer Science and Technology", Vol. 2, pages 1-91, Interscience Publishers (1965).

Phenoplast resins are the reaction product of phenols and formaldehyde which contain reactive methylol groups. Examples of phenols which can be used to make the phenoplast resins are phenol, ortho, meta, or paracresol, 2,4-xylenol, para-tertiary-butylphenol and the like. Particularly useful phenoplast resins are polymethylol phenols wherein the phenolic hydroxyl group is etherified with an alkyl or unsaturated aliphatic group such as methyl or ethyl, or an allyl group. Phenoplast resins and their method of preparation are described in detail in "Encyclopedia of Polymer Science and Technology", Vol. 10, pages 1-68, Interscience Publishers (1969).

The materials derived from N-methylol(meth)acrylamide or lower alkylated derivatives thereof, that is, alkylated with a $C_1$ to $C_6$ alcohol such as N-butoxymethyl(meth)acrylamide can be polymeric materials obtained by reacting N-methylol(meth)acrylamide or the alkylated derivatives thereof with other vinyl monomers such as methyl methacrylate, hydroxyethyl methacrylate, styrene and the like. To insure dispersibility, these polymers may optionally contain a cationic group such as would be introduced from a nitrogen-containing vinyl monomer which would be capable of protonization with an acid. Examples of such monomers include N,N'-dimethylaminoethylmethacrylate. Also, N-methylol(meth)acrylamide-containing polymers can be formed by reacting primary amine group-containing resins with N-methylol(meth)acrylamide as described in U.S. Pat. No. 4,341,676.

The formaldehyde scavenger which is used in the practice of the invention is a material which readily reacts with formaldehyde at ambient temperature under aqueous conditions, particularly dilute aqueous acidic conditions. Preferably, the formaldehyde scavenger is water-soluble. The use of non-ionic scavengers and scavengers which do not become ionic in the cationic medium are preferred since these will still have a minimum effect on electrodeposition bath conductivity and coating appearance.

Examples of suitable formaldehyde scavengers are amides (including imides), primary and secondary amines. Preferred are amides and particularly preferred is urea.

Besides urea, examples of other scavengers include melamine, benzoguanamine and alkyl and aryl-substituted derivatives of such compounds such as methyl urea, phenyl urea, 6-methyl-2,4-diamino-1,3,5-triazine, 2,4,6-trimethyltriamine-1,3,5-triazine and the like. Other scavengers include diazines, triazoles, guanidines, and other guanamines as well as reactive phenols. Examples of such materials are dicyandiamide, formoguanamine, acetoguanamine, 3,5-diaminotriazole, isocyanurate and resorcinol. Primary and secondary amines such as ammonia and alkanolamines such as N-methylethanolamine can be used but their use is not preferred because they form low molecular weight ionic materials in the electrodeposition bath which adversely affect bath conductivity. If these materials are used, they should be used at relative low levels.

The formaldehyde scavenger can be incorporated into the cationic composition by simply adding it to the composition if the scavenger is water-soluble. The formaldehyde scavenger can be added to the cationic resin concentrate or it can be added directly to the cationic electrodeposition bath. Preferably, the scavenger is added to the cationic resin concentrate. For example, a portion can be added along with the neutralizing acid and the remaining portion added with water for thinning the resin. When added to the electrodeposition bath, the formaldehyde scavenger can be prediluted with water or simply added to the bath. As the cationic electrodeposition bath is in use, the content of the scavenger in the bath can be continuously monitored and periodic additions of formaldehyde scavenger added.

With regard to the amounts of the ingredients in the cationic electrodepositable compositions, the positively charged resin is usually present in amounts of about 30 to 95, and preferably about 50 to 95 percent by weight based on weight of resin solids. When a material containing free formaldehyde and/or capable of generating free formaldehyde is included in the composition, it is usually present in amounts of about 1 to 60, preferably from about 5 to 40 percent by weight based on weight of resin solids. The source of formaldehyde may be from the positively charged resin itself as would be the case with compositions described in U.S. Pat. No. 4,134,932. The formaldehyde scavenger is usually present in amounts of about 0.5 to 30, and preferably from about 2 to 15 percent by weight based on weight of resin solids. Amounts of formaldehyde scavenger less than 0.5 percent by weight are usually not sufficient to control the pH, whereas amounts greater than 30 percent by weight may adversely affect coating properties of the electrodeposition bath.

The aqueous cationic compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 10 and usually less than 5 microns, preferably less than 0.5 micron. The concentration of the resinous phase in the aqueous medium is usually at least 1 and usually from about 2 to 60 percent by weight based on weight of the aqueous dispersion. The compositions of the present invention which are in the form of resin concentrates generally have a resin solids content of about 26 to 60 percent by weight based on weight of the aqueous dispersion. When the compositions of the present invention are in the form of electrodeposition baths, the resin solids content of the electrodeposition bath is usually within the range of about 5 to 25 percent by weight based on total weight of the aqueous dispersion.

Besides water, the aqueous medium may contain a coalescing solvent. Useful coalescing solvents include hydrocarbons, alcohols, alcohols, polyols and ketones. The preferred coalescing solvents include alcohols, polyols and ketones. Specific coalescing solvents include isopropanol, butanol, 2-ethylhexanol, isophorone, 4-methoxy-pentanone, ethylene and propylene glycol and the monoethyl, monobutyl and monohexyl ethers of ethylene glycol. The amount of coalescing solvent is generally between about 0.01 and 40 percent and when used, preferably from about 0.05 to about 25 percent by weight based on weight of the aqueous medium.

In some instances, a pigment composition and if desired various additives such as surfactants, wetting agents or catalyst are included in the dispersion. Pigment composition may be of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In the practice of the present invention, the pigment-to-resin ratio is usually within the range of 0.02 to 1:1. The other additives mentioned above are usually in the dispersion in amounts of about 0.01 to 3 percent by weight based on weight of resin solids.

When the aqueous dispersions as described above are employed for use in electrodeposition, the aqueous dispersion is placed in contact with an electrically conductive anode and an electrically conductive cathode with the surface to be coated being the cathode. Following contact with the aqueous dispersion, an adherent film of the coating composition is deposited on the cathode when a sufficient voltage is impressed between the electrodes. The conditions under which electrodeposition is carried out are, in general, similar to those used in electrodeposition of other types of coatings. The applied voltage may be varied and can be, for example, as low as 1 volt to as high as several thousand volts, but typically between 50 and 500 volts. The current density is usually between 0.5 ampere and 5 ampere per square foot and tends to decrease during electrodeposition indicating the formation of an insulating film. The coating compositions of the present invention can be applied to a variety of electroconductive substrates especially metals such as steel, aluminum, copper, magnesium and conductive carbon coated materials.

After the coating has been applied by electrodeposition, it is cured usually by baking at elevated temperatures such as 90°–260° C. for about 1 to 40 minutes.

Illustrating the invention are the following examples which, however, are not to be considered as limiting the invention to their details. All parts and percentages in the examples as well as throughout the specification are by weight unless otherwise indicated.

EXAMPLES

The following examples show the effect formaldehyde has on lowering the pH of an aqueous cationic composition and how the pH can be stabilized by the addition of a formaldehyde scavenger.

Example A

This example shows the effect of formaldehyde on lowering the pH of a cationic electrodepositable composition. The composition was in the form of a resin concentrate which was contaminated with about 0.3 percent by weight based on resin solids of formaldehyde.

The film-forming resin was prepared by reacting a polyepoxide with N-methylethanolamine and the methyl isobutyl diketimine of diethylenetriamine. The reaction product was combined with a fully blocked polyisocyanate and then solubilized with acid as generally described in Example B of U.S. Pat. No. 4,419,467 with the exception that aqueous lactic acid (91.2 percent) was used in place of acetic acid. The resin had a solids content of 36.6 percent.

The resin (2220 grams) was thinned with an additional 300 grams of deionized water and contaminated with 6.63 grams of 37 percent aqueous formalin. The pH of the uncontaminated resin was 6.5. The resin was then heated for about 2 hours at about 65° C. The pH of the resin dropped to 6.23. A sample of the resin treated similarly but with no formaldehyde contamination had a pH drop to only 6.42.

EXAMPLE I

The following example shows the effect of urea on stabilizing the pH of cationic electrodepositable compositions which contain an aminoplast prepared from formaldehyde.

Three resin concentrate samples were prepared. All of the samples contained about 26 percent by weight based on weight of resin solids of a mixed methylated butylated melamine-formaldehyde condensate available from Monsanto Company as RESIMINE 757. One of the samples contained 3 percent urea, one sample 6 percent urea (percentage by weight based on weight of resin solids), and for the purposes of control, one sample contained no urea. The resin concentrates were prepared as generally described in Example A above with the exception that no formaldehyde was used to contaminate the resin (literature indicates RESIMINE 757 contains about 0.5 percent free formaldehyde) and the resins contained the aminoplast and urea which were added prior to heating. The resin samples were heated to about 65° C. for about 2 hours and then heat aged at 140° F. (60° C.) for about 16 hours. The change in pH after heat aging was as follows:

| Sample | pH Before Heat Aging | pH After Heat Aging |
| --- | --- | --- |
| No urea | 6.37 | 6.02 |
| 3% urea | 6.38 | 6.13 |
| 6% urea | 6.42 | 6.32 |

EXAMPLE II

The following example shows the effect of urea on throwpower of a cationic electrodeposition bath. Electrodeposition baths were prepared with about 5 and 10 percent by weight urea (percentage by weight based on weight of resin solids). Steel panels were then electrodeposited in the baths and the throwpower of the baths evaluated.

The cationic electrodeposition baths were prepared from the cationic resin as described in Example I above with the exception that the resin contained about 10 percent by weight RESIMINE 757 and 9.41 percent by weight (percentages by weight being based on weight of resin solids) of an additive described in Example H of U.S. Pat. No. 4,419,467. The resin was pigmented with titanium dioxide, carbon black and lead silicate and combined with a tin catalyst and thinned with deionized water to form the electrodeposition bath. The urea was simply added to and dissolved in the electrodeposition bath. The bath had a solids (resin plus pigment) content of 25 percent by weight, a pigment-to-binder ratio of 0.254/1.

The bath containing the 5 percent by weight urea had a specific conductivity at 77° F. (25° C.) of 1700. The bath containing the 10 percent by weight urea had a specific conductivity at 77° F. (25° C.) of 1730.

Steel panels were cathodically electrodeposited in these baths at 275 volts for 2 minutes at a bath temperature of 83° F. (28° C.) and the GM throwpower determined. At a 17-inch (43.18 cm) dip, the 5 percent by weight urea bath had a GM throwpower of 12½ inches (31.75 cm); the 10 percent by weight urea bath had a GM throwpower of 11½ inches (29.21 cm).

It is to be understood that the foregoing detailed description is given merely by way of illustration and many variations may be made therein without departing from the spirit of the invention.

We claim:

1. An aqueous cationic electrodepositable composition which contains a positively charged film-forming resin and which contains a material which has methylol or substituted methylol groups and is prepared from a formaldehdye-reactive material and formaldehyde; said material containing free formaldehyde and/or being capable of generating free formaldehyde which lowers the pH of the cationic composition, said composition further containing a formaldehyde scavenger which is non-ionic and which does not become ionic in the cationic composition; said formaldehyde scavenger being present in an amount sufficient to stabilize the pH of the composition such that when the compositin is heated at 60° C. for 16 hours, the change in pH will be less than 0.3 pH units.

2. The composition of claim 1 which contains a positively charged resin containing primary and/or secondary amine groups.

3. The composition of claim 1 in which the formaldehyde scavenger is water-soluble.

4. The composition of claim 3 in which the formaldehyde scavenger is an amide which is reactive with formaldehyde under aqueous conditions.

5. The composition of claim 4 in which the formaldehyde scavenger is urea.

6. The composition of claim 5 in which the urea is present in the composition in amounts of about 2 to 15 percent by weight based on weight of resin solids.

7. The composition of claim 1 which contains an aminoplast.

8. The composition of claim 7 in which the aminoplast is a condensate of melamine and formaldehyde.

9. The composition of claim 8 in which the melamine-formaldehyde condensate is alkylated with an alcohol or mixture of alcohols containing from 1 to 6 carbon atoms.

10. The composition of claim 7 in which the aminoplast is present in amounts of about 3 to 50 percent by weight based on weight of resin solids.

11. The composition of claim 1 in which the aqueous cationic composition has a resin solids content of about 2 to 60 percent by weight.

12. The composition of claim 1 in which the aqueous cationic composition is in the form of a resin concentrate having a resin solids content of 26 to 60 percent by weight.

13. The composition of claim 1 in which the aqueous cationic composition is in the form of an electrodeposition bath having a resin solids content of 5 to 25 percent by weight.

14. An aqueous electrodepositable cationic composition comprising a positively charge resin containing primary and/or secondary amino groups and an aminoplast which contains free formaldehyde and/or is capable of generating free formaldehyde that lowers the pH of the cationic composition, said composition further containing urea in an amount sufficient to stabilize the pH of the composition such that when the compsition is heated at 60° C. for 16 hours, the change in pH will be less than 0.3 pH units.

* * * * *